Patented Jan. 4, 1938

2,104,701

UNITED STATES PATENT OFFICE 2,104,701

PROCESS OF MAKING VANILLIN

Lloyd T. Sandborn, Wausau, Wis., assignor to Marathon Paper Mills Company, Rothschild, Wis., a corporation of Wisconsin, and Guy C. Howard Company, Rothschild, Wis., a corporation of Washington, jointly No Drawing. Application March 1, 1937,
Serial No. 128,553

16 Claims. (Cl. 260—137)

This invention relates to a process of making vanillin from lignin substance and more especially to a process of isolating vanillin from an alkaline solution.

It is known that vanillin can be made by cooking lignin substance, e. g., sodium lignin sulfonic acid, with caustic alkali and isolating the vanillin by acidifying the cooked alkaline liquor and extracting the acidified solution with an organic solvent for vanillin. In order to secure commercially feasible yields of vanillin in respect to both the lignin substance and the caustic alkali, the cooking is ordinarily carried out under pressure at a temperature of about 150 to 200° C. Under these conditions lignin sulfonic acid is so altered as to render it largely insoluble in neutral or acid solution. The presence of this precipitate renders the extraction of the acidified solution difficult. If it is left in it causes emulsions and absorbs large amounts of the solvent and if it is removed it occludes considerable amounts of vanillin. The vanillin thus occluded is not easily washed out of or extracted from the precipitate.

United States Patent 2,057,117 describes a process in which sulphurous acid or sulphur dioxide is used to acidify the alkaline liquor whereby it is possible to simultaneously precipitate the acid insoluble material and form the vanillin bisulphite addition product which is much more soluble in water than vanillin and occludes less readily to the precipitate. This process makes it possible to remove the precipitate without loss of vanillin other than that dissolved in the mother liquor retained on the precipitate. While this can be washed out with water such washing increases the volume of liquor to be handled in subsequent steps to a considerable extent, and consequently increases the cost of the process.

From the above discussion it is apparent that the complete removal of vanillin would be greatly facilitated if the precipitation step could be avoided, e. g., if the vanillin could be extracted from the alkaline solution. The present invention depends on the discovery that vanillin can be economically extracted from sodium hydroxide solution with butyl alcohol or other alcohols which are sufficiently insoluble or immiscible in water solution so that separate layers will form and which will give a satisfactory partition coefficient. I have found, for example, the following representative alcohols can be used advantageously: sec-butyl alcohol, benzyl alcohol, n-butyl alcohol, cyclohexanol, normal-amyl alcohol, sec-amyl alcohol. I may also use mixtures of alcohols which give satisfactory partition coefficients.

The comparative solvent action of such alcohols is illustrated by the following data. When a solution containing 5–6 grams per liter of vanillin and 25 grams per liter of NaOH is extracted three times, each time with an equal volume of solvent, the following alcohols extracted the following percentages of the vanillin in the original solution: n-butyl (59.4), sec-butyl (46.7), n-amyl (17.4), sec-amyl (5.5), cyclohexanol (33.5), benzyl (34).

This process is applicable to any process of making vanillin in which the vanillin is obtained in an alkaline solution but the advantages in its use are especially pronounced in those processes in which the alkaline vanillin solution contains a large amount of organic matter which will not go into the alcohol layer from alkaline solutions as is the case in making vanillin from lignin substance, e. g., lignin sulfonic acid, waste sulphite liquor, crude lignin extract, ligno-cellulose material or lignin derivatives derived from processing ligno-cellulose material as described in U. S. Patent 2,057,117; and also where a large excess of caustic alkali is used.

In addition to the advantage, pointed out above, of avoiding any loss of vanillin due to its being occluded to the precipitate, extraction of vanillin from the alkaline solution possesses the further important advantage of avoiding the use of acid for neutralization thereby materially reducing the chemicals cost of the procedure. Moreover, the caustic soda is left in as such or in a form making its recovery and reuse practical. Obviously, eliminating the acidification would cheapen and simplify the process considerably. In case the alkaline liquor is extracted directly the extracted liquor still contains caustic soda and sodium salts, and because of this soda content the solution possesses utility as a starting material for a number of further processes.

Another advantage of the present invention is that it is possible to extract the vanillin from liquors which are not corrosive to iron and hence the equipment used in handling the liquor containing the vanillin is less expensive and greatly simplified over that required in previously known methods involving the handling of acid solutions.

The novelty and utility of the invention having been discussed, the process will now be described as applied to the basic calcium salt of lignin-sulfonic acid as obtained from waste sulphite liquor by the procedures covered by U. S. Patents Reissue No. 18,268 and No. 1,856,558 issued to Howard. It is understood that this material is selected to illustrate the procedure and to enable those skilled in the art to adapt the procedure to the use of other forms of lignin substance. As regards choice of starting material and formation of vanillin this process is essentially that of U. S. Patent No. 2,057,117, but differs in the method of isolating the vanillin from the alkaline liquor. It is to be understood also that the present invention can be applied to any process of making vanillin in which vanillin is present in alkaline solution.

The basic calcium salt of lignin-sulfonic acid as obtained in the aforementioned Howard patents is converted into the corresponding sodium or other alkali metal salt by treating it with sodium hydroxide or salts such as $Na_2CO_3$, $Na_2SO_3$, $Na_2SO_4$. The resulting inorganic calcium salts are preferably removed from the solution of sodium lignin-sulfonic acid. An additional amount of sodium hydroxide, e. g., 25 per cent by weight of the lignin substance is added to the sodium lignin-sulfonic acid solution and the solution is cooked under pressure for ½–1½ hours at 130–200 lbs. During this cooking 2–3 per cent of the lignin substance is converted into vanillin which is present in the alkaline solution as sodium or other alkali metal vanillate. The steps so far described are disclosed in U. S. Patent No. 2,057,117 wherein further details are disclosed as to variations which may be taken in the process when different starting materials are used.

The alkaline solution is then extracted directly with a substantially water immiscible alcohol having a satisfactory partition coefficient such, for example, as n-butyl alcohol. This extraction can be carried out in any manner, as for example, by shaking or stirring the alkaline mixture with the solvent and separating the layers, or by passing the alkaline liquor and solvent countercurrently through extraction towers, or by spraying the solvent through the alkaline liquor contained in tanks and so arranged that the solvent which separates and is withdrawn from the top of one tank is introduced as a spray at the bottom of another tank of the alkaline liquor.

The aqueous phase can be treated for recovery of dissolved solvent by any known means. For example, in using n-butyl alcohol the alkaline liquor dissolves an appreciable amount of the solvent but this can be recovered completely by heating the said liquor and distilling off the butyl alcohol which comes off readily as a butyl alcohol-water binary mixture boiling at 93° C.

The solvent phase at this point of the process contains the vanillin as sodium vanillate and also some other organic matter which has also been extracted. The amount and nature of this other organic matter will vary depending on the starting material and on the method of making the vanillin. The organic matter other than vanillin is largely phenolic in nature and it does not contain an aldehyde group, hence it is easily separated from the vanillin.

The vanillin can be isolated from the butyl alcohol by known means. For example, the butyl alcohol can be distilled off, completing the distillation by passing in steam so as to yield an aqueous solution of sodium vanillate and other organic sodium salts. If this solution is acidified with $SO_2$ the vanillin is converted to the soluble vanillin bisulphite addition product and most of the other organic matter separates out as a tarry product which can be readily removed. Then, if $H_2SO_4$ is added to the bisulphite solution and the $SO_2$ which forms is expelled, crude vanillin precipitates. The vanillin thus obtained may be purified by known means such as recrystallization, distillation or dissolving it in a solvent from which it can be extracted as its bisulphite addition product.

I claim:

1. A process for making vanillin which comprises cooking under pressure with water and an alkali-metal hydroxide, a material selected from the group consisting of ligno-cellulose, crude lignin extract, and a lignin-sulfonic acid compound to produce an alkaline vanillin-containing liquor, extracting vanillin from said liquor with a substantially water-immiscible alcohol, separating the alcohol from the said liquor, recovering crude vanillin from said alcohol and treating said crude vanillin to secure pure vanillin.

2. A process for making vanillin which comprises cooking with water and an alkali-metal hydroxide, a material selected from the group consisting of ligno-cellulose, crude lignin extract, and a lignin-sulfonic acid compound to produce an alkaline vanillin-containing liquor, extracting vanillin from said liquor with a substantially water-immiscible alcohol, separating the alcohol from the said liquor, recovering crude vanillin from said alcohol and treating said crude vanillin to secure pure vanillin.

3. A process for making vanillin which comprises cooking under pressure with water and an alkali-metal hydroxide, a material selected from the group consisting of ligno-cellulose, crude lignin extract, and a lignin-sulfonic acid compound to produce an alkaline vanillin-containing liquor, extracting vanillin from said liquor with normal butyl alcohol, separating the alcohol from the said liquor, recovering crude vanillin from said alcohol and treating said crude vanillin to secure pure vanillin.

4. A process of extracting vanillin from an alkaline liquor produced by cooking under pressure with water and an alkali-metal hydroxide, a material selected from the group consisting of ligno-cellulose, crude lignin extract, and a lignin-sulfonic acid compound which comprises bringing a substantially water-immiscible alcohol into intimate contact with said liquor to dissolve the vanillin contained therein, separating the alcohol from the said liquor, and recovering crude vanillin from said alcohol.

5. A process of extracting vanillin from an alkaline liquor produced by cooking under pressure with water and an alkali-metal hydroxide, a material selected from the group consisting of ligno-cellulose, crude lignin extract, and a lignin-sulfonic acid compound which comprises bringing a butyl alcohol into intimate contact with said liquor to dissolve the vanillin contained therein, separating the alcohol from the said liquor, and recovering crude vanillin from said alcohol.

6. A process of extracting vanillin from an alkaline liquor which comprises bringing normal butyl alcohol into intimate contact with said liquor to dissolve the vanillin contained therein, separating the alcohol from the said liquor, and recovering vanillin from said alcohol.

7. A process of extracting vanillin from a liquor which comprises bringing a substantially water-immiscible alcohol into intimate contact with said liquor to dissolve the vanillin contained therein, separating the alcohol from the said liquor, and recovering vanillin from said alcohol.

8. A process of making vanillin which comprises treating a calcium salt of lignin-sulfonic acid with an alkali-metal salt capable of precipitating a calcium salt whereby such precipitate and an alkali metal salt of lignin-sulfonic acid are produced, separating out the precipitated calcium salt and subjecting said alkali-metal salt of lignin-sulfonic acid in aqueous solution to a pressure cook in presence of an alkali-metal hydroxide to produce an alkaline vanillin-containing liquor, extracting vanillin from said liquor with a substantially water-immiscible alcohol, separating the alcohol from the said liquor, recovering crude vanillin from said alcohol and removing the non-vanillin constituents to secure pure vanillin.

9. A process of making vanillin which comprises treating a calcium salt of lignin sulfonic acid with an alkali-metal salt capable of precipitating a calcium salt, whereby such precipitate and an alkali-metal salt of lignin-sulfonic acid are produced, separating out the precipitated calcium salt and subjecting said alkali-metal salt of lignin-sulfonic acid in aqueous solution to a pressure cook in presence of an alkali-metal hydroxide to produce an alkaline vanillin-containing liquor, extracting vanillin from said liquor with normal butyl alcohol, separating the alcohol from the said liquor, recovering crude vanillin from said alcohol and removing the non-vanillin constituents to secure pure vanillin.

10. A process for making vanillin which comprises cooking under pressure with water and an alkali-metal hydroxide, a material selected from the group consisting of ligno-cellulose, crude lignin extract, and a lignin-sulfonic acid compound to produce an alkaline vanillin-containing liquor, extracting vanillin from said liquor with a substantially water-immiscible alcohol, separating the alcohol from the said liquor, distilling off the alcohol, completing the distillation by passing steam into said alcohol solution to yield an aqueous solution containing vanillin and other constituents, acidifying said solution with sulphurous acid to form an aqueous solution of vanillin bisulphite addition product and water insoluble substances, separating said water-insoluble constituents from said solution, and treating said solution with sulphuric acid to liberate $SO_2$ and precipitate crude vanillin therefrom.

11. A process for making vanillin which comprises cooking under pressure with water and an alkali-metal hydroxide, a material selected from the group consisting of ligno-cellulose, crude lignin extract, and a lignin-sulfonic acid compound to produce an alkaline vanillin-containing liquor, intimately contacting said liquor with normal butyl alcohol to dissolve the vanillin, separating the alcohol from the said liquor, distilling off the alcohol, completing the distillation by passing steam into said alcohol solution to yield an aqueous solution containing vanillin and other constituents, acidifying said solution with sulphurous acid to form an aqueous solution of vanillin bisulphite addition product and water insoluble substances, separating said water-insoluble constituents from said solution, and treating said solution with sulphuric acid to liberate $SO_2$ and precipitate crude vanillin therefrom.

12. A process as defined in claim 2 wherein the material cooked with alkali-metal hydroxide is an alkali-metal salt of lignin-sulfonic acid.

13. A process as defined in claim 3 wherein the material cooked with alkali-metal hydroxide is an alkali-metal salt of lignin-sulfonic acid.

14. A process for making vanillin which comprises cooking under pressure with water and sodium hydroxide, a material selected from the group consisting of ligno-cellulose, crude lignin extract, and a lignin-sulfonic acid compound to produce an alkaline vanillin-containing liquor, extracting vanillin from said liquor with a substantially water-immiscible alcohol, separating the alcohol from the said liquor, recovering crude vanillin from said alcohol and treating said crude vanillin to secure pure vanillin.

15. A process for making vanillin, which comprises cooking under pressure with water and sodium hydroxide, a material selected from the group consisting of ligno-cellulose, crude lignin extract, and a lignin-sulfonic acid compound to produce an alkaline vanillin-containing liquor, extracting vanillin from said liquor with normal butyl alcohol, separating the alcohol from the said liquor, recovering crude vanillin from said alcohol and treating said crude vanillin to secure pure vanillin.

16. A process for making vanillin which comprises cooking under pressure with water and sodium hydroxide, a material selected from the group consisting of ligno-cellulose, crude lignin extract, and a lignin-sulfonic acid compound to produce an alkaline vanillin-containing liquor, intimately contacting said liquor with normal butyl alcohol to dissolve the vanillin, separating the alcohol from the said liquor, distilling off the alcohol, completing the distillation by passing steam into said alcohol solution to yield an aqueous solution containing vanillin and other constituents, acidifying said solution with sulphurous acid to form an aqueous solution of vanillin bisulphite addition product and water insoluble substances, separating said water-insoluble constituents from said solution, and treating said solution with sulphuric acid to liberate $SO_2$ and precipitate crude vanillin therefrom.

LLOYD T. SANDBORN.